US012808456B2

(12) United States Patent
Baxter

(10) Patent No.: US 12,808,456 B2
(45) Date of Patent: Nov. 24, 2026

(54) MONITORING SYSTEM AND METHOD FOR ENERGIZED SOLENOID VALVES MOUNTED IN CLOSE PROXIMITY TO ONE ANOTHER

(71) Applicant: Dust Company, Inc., Raleigh, NC (US)

(72) Inventor: Robert W. Baxter, Raleigh, NC (US)

(73) Assignee: Dust Company, Inc., Raleigh, NC (US)

( * ) Notice: Subject to any disclaimer, the term of this patent is extended or adjusted under 35 U.S.C. 154(b) by 240 days.

(21) Appl. No.: 18/882,808

(22) Filed: Sep. 12, 2024

(65) Prior Publication Data

US 2025/0084931 A1 Mar. 13, 2025

Related U.S. Application Data

(60) Provisional application No. 63/582,073, filed on Sep. 12, 2023.

(51) Int. Cl.
*B01D 53/02* (2006.01)
*B01D 46/04* (2006.01)
(Continued)

(52) U.S. Cl.
CPC .......... *F16K 37/0083* (2013.01); *B01D 46/04* (2013.01); *B01D 46/4272* (2013.01); *B01D 46/58* (2022.01); *F16K 31/40* (2013.01)

(58) Field of Classification Search
CPC .... B01D 46/0086; B01D 46/02; B01D 46/04; B01D 46/4272; B01D 46/44; B01D 46/46;
(Continued)

(56) References Cited

U.S. PATENT DOCUMENTS 4,246,621 A * 1/1981 Tsukioka ............ F16K 31/0675 361/111
4,384,874 A * 5/1983 Dattilo .................. B01D 46/04 96/426

(Continued)

FOREIGN PATENT DOCUMENTS

| | | | |
|---|---|---|---|
| CA | 1312220 | C | 1/1993 |
| CA | 3133444 | A1 | 9/2020 |
| CN | 105980030 | A | 9/2016 |

OTHER PUBLICATIONS

International Search Report and Written Opinion corresponding to PCT/US2024/046303; mailed Nov. 19, 2024, (12 pages).

(Continued)

*Primary Examiner* — Christopher P Jones
(74) *Attorney, Agent, or Firm* — Myers Bigel, P.A.

(57) ABSTRACT

A system includes a baghouse filter system comprising a plurality of fabric filters; and a valve system comprising a plurality of solenoid pilot valves each of the plurality of solenoid pilot valves including a solenoid coil, the plurality of solenoid pilot valves being operable to selectively release compressed air into the plurality of fabric filters, respectively, responsive to one or more valve control signals, the valve system further comprising a plurality of sensors associated respectively corresponding to the plurality of solenoid coils, each of the plurality of sensors being configured to output an ambient voltage when its corresponding solenoid coil is not energized, a first voltage when its corresponding solenoid coil is energized, and a second voltage when a neighboring solenoid coil is energized.

20 Claims, 6 Drawing Sheets

(51) Int. Cl.
*B01D 46/42* (2006.01)
*B01D 46/58* (2022.01)
*F16K 31/40* (2006.01)
*F16K 37/00* (2006.01)

(58) Field of Classification Search
CPC ......... B01D 46/58; B01D 46/71; F16K 31/40; F16K 37/0083
See application file for complete search history.

(56) References Cited

U.S. PATENT DOCUMENTS

| | | | | |
|---|---|---|---|---|
| 6,154,354 | A * | 11/2000 | Alexanian | H01F 7/1872 361/160 |
| 9,782,711 | B2 | 10/2017 | Barker | |
| 2017/0028337 | A1 | 2/2017 | Baxter | |
| 2019/0076771 | A1 | 3/2019 | Baxter et al. | |
| 2019/0176075 | A1 * | 6/2019 | Hoff | F02M 35/09 |
| 2020/0298163 | A1 * | 9/2020 | Baxter | B01D 46/0086 |

OTHER PUBLICATIONS

International Preliminary Report on Patentability issued in corresponding PCT/US2024/046303 on Mar. 17, 2026, (6 pages).

* cited by examiner

MONITORING SYSTEM AND METHOD FOR ENERGIZED SOLENOID VALVES MOUNTED IN CLOSE PROXIMITY TO ONE ANOTHER

CROSS REFERENCE TO RELATED APPLICATION

The present application claims priority to U.S. Provisional Patent Application Ser. No. 63/582,073, filed Sep. 12, 2023, the entire content of which is incorporated by reference herein as if set forth in its entirety.

FIELD OF THE INVENTION

The present invention relates to industrial pollution control systems and, more particularly, to fabric filter monitoring and diagnostic systems for fabric filters. A fabric filter unit may comprise one or more compartments containing rows of fabric bags in the form of round, flat, or shaped tubes, or pleated cartridges. Fabric filters are sometimes referred to in industry as baghouses.

BACKGROUND

A baghouse or fabric filter, whether it uses traditional bags with cages or pleated cartridge filters, is an air pollution control device that removes particulates out of air or gas released from commercial processes or combustion for electricity generation. Many different types of industrial companies use baghouses to control emission of air pollutants including power plants, steel mills, pharmaceutical producers, food manufacturers, and chemical producers. Depending on the process requirements and/or air flow to be cleaned, baghouses can range from a single compartment filter to a large multi-compartment filter. Baghouses are generally defined by their cleaning methods. The two major categories are off-line cleaning baghouses and on-line cleaning baghouses. Off-line cleaning refers to the type of baghouse where the compartment is isolated and does not filter dirty air during the cleaning process. The types of baghouses using off-line cleaning include shakers, sonic horns, pulse-jet, and reverse air. On-line cleaning refers to a baghouse or compartment that is not isolated when it is cleaned and continues to filter dirty air. The only type of baghouse that currently uses on-line cleaning is a pulse-jet style baghouse.

The pulse-jet style baghouse design is based on energizing or firing the pulse-valves to generate a blast of air down each bag in a row. In some examples, pulse-jet baghouses use a pulse of compressed air to send a pulse wave down a row of filtering bags to "shock" the filtered particles off of the outside of the bag so they can fall into the hopper below and be removed. This style of baghouse typically has one solenoid pilot valve for each row of bags. Larger baghouses may have split rows and may use two valves per row. The row valves are designed to open quickly to provide a short pulse and then close. Their source of air is normally a local supply header close to the valves. After the pulse, the header replenishes the pulsed air until it is at the desired pressure. The refilling process typically can take 1-5 seconds depending on the size and length of the supply line. In an off-line configuration, each compartment may use up to four additional outputs and four additional inputs. The outputs would be to open and close the inlet and output isolation valves and the input would be switches to confirm the isolation valve position.

As described above, solenoid valves are used in the cleaning process of baghouses and filters. The solenoid valves are referred to as pilot valves. When a pilot valve on a bag row is energized, it opens to release compressed air from the seat of the larger diaphragm valve. When the pressure is released from the seat, the diaphragm valve opens and allows a large pulse of compressed air to travel down the blow-pipe and into each bag on the row. The pulse of air travels down each bag to push particles off each bag in the cleaning process. In most cases the solenoid valves are only open from 100 milliseconds to 200 milliseconds.

When the solenoid valve is energized, it creates a magnetic field which pulls up the plunger and opens the valve allowing air to escape the diaphragm valve seat. There are numerous methods to detect if or when a solenoid valve is energized, such as reed switches, which provide an on/off indication. But reed switches are not specific to one solenoid coil and can be affected by other magnetic sources close by. This is especially a problem since many baghouse applications mount 8 to 12 pilot valves in a single enclosure or in close proximity to each other. Inside these enclosures multiple reed switches may activate when a single valve is energized.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments of the inventive concept provide a system comprising a baghouse filter system comprising a plurality of fabric filters; and a valve system comprising a plurality of solenoid pilot valves each of the plurality of solenoid pilot valves including a solenoid coil, the plurality of solenoid pilot valves being operable to selectively release compressed air into the plurality of fabric filters, respectively, responsive to one or more valve control signals, the valve system further comprising a plurality of sensors associated respectively corresponding to the plurality of solenoid coils, each of the plurality of sensors being configured to output an ambient voltage when its corresponding solenoid coil is not energized, a first voltage when its corresponding solenoid coil is energized, and a second voltage when a neighboring solenoid coil is energized.

In other embodiments, the system further comprises a control system configured to generate the one or more valve control signals.

In still other embodiments, the plurality of sensors comprises a plurality of Hall effect sensors.

In still other embodiments, each of the plurality of Hall effect sensors has a positive side that is positioned closed to the respective one of the plurality of solenoid coils to which it corresponds; and the first voltage is greater than the ambient voltage and the second voltage is less than the ambient voltage.

In still other embodiments, the system further comprises a monitoring system that is configured to receive an output from the plurality of sensors based on the ambient voltage, the first voltage and the second voltage.

In still other embodiments, the valve system comprises a communication interface; and the communication interface is configured to output one or more status signals for one or more of the plurality of solenoid pilot valves based on the ambient voltage, the first voltage, and the second voltage.

In still other embodiments, the monitoring system is configured to receive the one or more status signals.

In still other embodiments, the monitoring system is configured to cause performance of a diagnostic operation or a maintenance operation on one or more of the plurality of solenoid pilot valves based on the one or more status signals.

In still other embodiments, the one or more status signals comprises a group status signal that indicates one of the plurality of solenoid valves has been energized without identifying the one of the plurality of solenoid valves; and the monitoring system is configured to receive the group status signal.

In still other embodiments, the monitoring system is further configured to determine the status of at least a portion of the respective ones of the plurality of solenoid valves responsive to the group status signal; and the monitoring system is further configured to cause performance of a diagnostic operation or a maintenance operation on one or more of the plurality of solenoid pilot valves based on the status determinations for at least the portion of the respective ones of the plurality of solenoid valves.

In still other embodiments, the monitoring system is configured to cause performance of a diagnostic operation or a maintenance operation on one or more of the plurality of solenoid pilot valves based on the ambient voltage, the first voltage and the second voltage.

Some embodiments of the inventive concept provide a method comprising providing a baghouse filter system comprising a plurality of fabric filters; operating a valve system comprising a plurality of solenoid pilot valves each of the plurality of solenoid pilot valves including a solenoid coil to selectively release compressed air into the plurality of fabric filters, respectively, responsive to one or more valve control signals, the valve system further comprising a plurality of sensors associated respectively corresponding to the plurality of solenoid coils; and outputting, from each of the plurality of sensors, an ambient voltage when its corresponding solenoid coil is not energized, a first voltage when its corresponding solenoid coil is energized, and a second voltage when a neighboring solenoid coil is energized.

In further embodiments, the method further comprising generating the one or more valve control signals using a control system.

In still further embodiments, the plurality of sensors comprises a plurality of Hall effect sensors.

In still further embodiments, each of the plurality of Hall effect sensors has a positive side that is positioned closed to the respective one of the plurality of solenoid coils to which it corresponds.

In still further embodiments, the first voltage is greater than the ambient voltage and the second voltage is less than the ambient voltage.

In still further embodiments, the method further comprises receiving, at a monitoring system, an output from the plurality of sensors based on the ambient voltage, the first voltage and the second voltage.

In still further embodiments, the valve system comprises a communication interface, the method further comprising: outputting, using the communication interface, one or more status signals for one or more of the plurality of solenoid pilot valves based on the ambient voltage, the first voltage, and the second voltage.

In still further embodiments, the method further comprises receiving the one or more status signals at the monitoring system; and causing performance of a diagnostic operation or a maintenance operation on one or more of the plurality of solenoid pilot valves based on the one or more status signals.

Some embodiments of the inventive concept provide a device comprising a housing; and a valve system in the housing, the valve system comprising a plurality of solenoid pilot valves each of the plurality of solenoid pilot valves including a solenoid coil, the plurality of solenoid pilot valves being operable to selectively release compressed air responsive to one or more valve control signals, the valve system further comprising a plurality of sensors associated respectively corresponding to the plurality of solenoid coils, each of the plurality of sensors being configured to output an ambient voltage when its corresponding solenoid coil is not energized, a first voltage when its corresponding solenoid coil is energized, and a second voltage when a neighboring solenoid coil is energized.

Other methods, systems, computer program products, devices, and/or apparatus according to embodiments of the inventive concept will be or become apparent to one with skill in the art upon review of the following drawings and detailed description. It is intended that all such additional methods, systems, computer program products, and/or apparatus be included within this description, be within the scope of the present invention, and be protected by the accompanying claims. It is noted that aspects of the invention described with respect to one embodiment, may be incorporated in a different embodiment although not specifically described relative thereto. That is, all embodiments and/or features of any embodiment can be combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION

Figure 1:
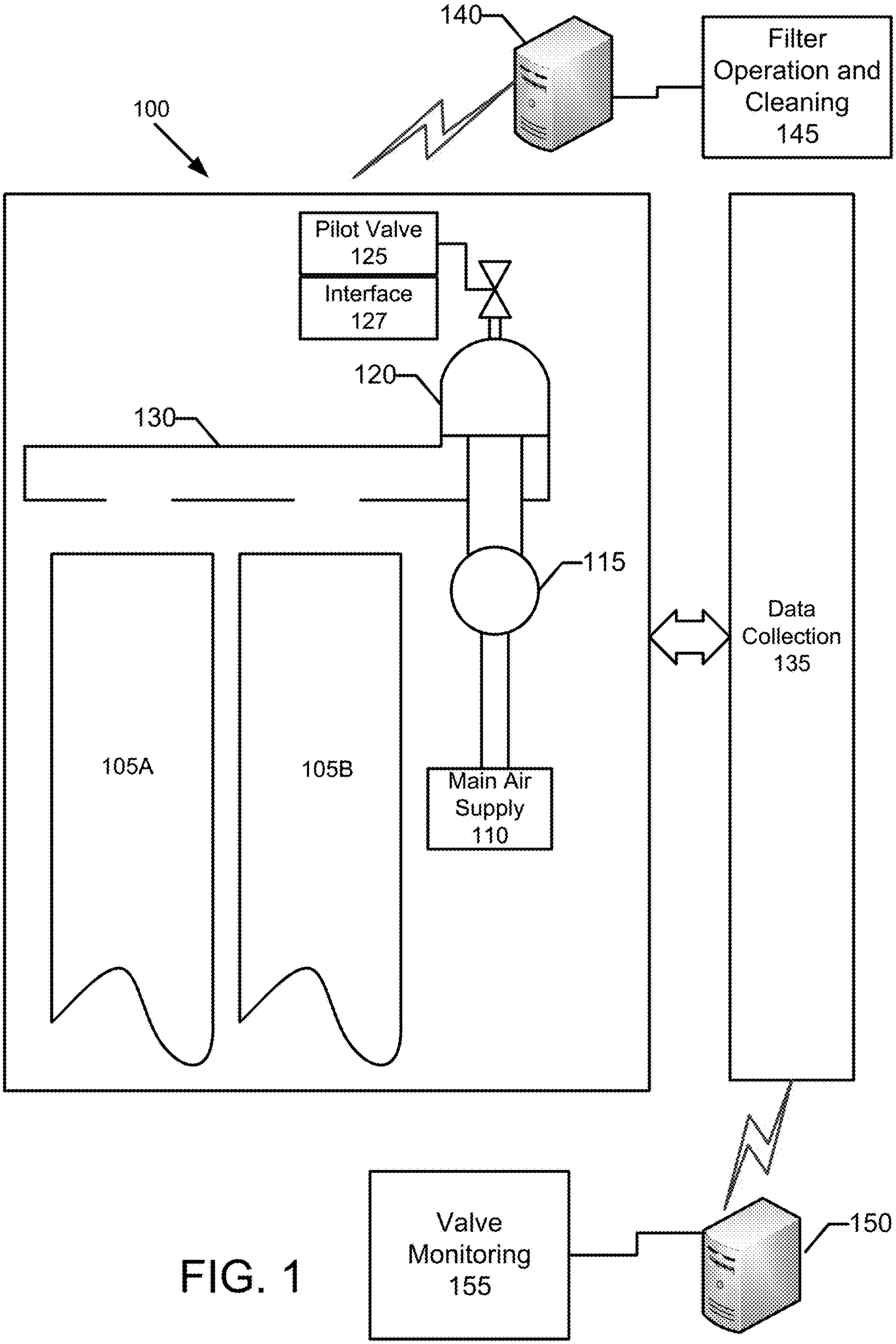
FIG. 1 is a diagram that illustrates a system for operating, cleaning, and diagnosing a fabric filter, such as a baghouse, according to some embodiments of the inventive concept.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms “a,” “an,” and “the” are intended to include the plural forms as well, unless expressly stated otherwise. It should be further understood that the terms “comprises” and/or “comprising” when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being “connected” or “coupled” to another element, it can be directly connected or coupled to the other element or intervening elements may be present. As used herein, the term “and/or” includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Embodiments of the inventive subject matter are described herein with respect to maintaining a fabric filter including the cleaning thereof. As described above, a fabric filter unit may comprise one or more compartments containing rows of fabric bags in the form of round, flat, or shaped tubes, and/or pleated cartridges. Fabric filters may be referred to in industry as baghouses.

As used herein a statistical pulse of air that is generated in response to the opening and closing of a solenoid pilot valve or pulsing valve has a duration that begins with the opening of the valve and ends when the air flow returns to an ambient level, typically zero or no flow, and/or ends when a pressure in a header supply tank returns to an ambient pressure level after dropping in response to the opening of the valve.

Embodiments of the inventive concept may provide a system and method, which can be installed alongside an existing filter control system, e.g., system that manages the filter operation and/or cleaning, to provide monitoring of solenoid pilot valves to determine when a valve is energized and to be able to identify which valve out of multiple valves that may be positioned close to one another for use in cleaning multiple rows of fabric bags, for example, has been energized. Some embodiments of the inventive concept may provide a method of monitoring energized solenoid valves by using Hall effect sensors on each solenoid coil with the positive side of the hall effect sensor being positioned closest to the coil. This technique can also be used in other applications where solenoid activated devices (or devices that operate based on a magnetic field) are positioned in relative close proximity to each other where the magnetic fields may affect sensor operations making it difficult to distinguish between the activation or energization of different devices. Conventional solenoid valve diagnostic systems may be built into existing embedded control hardware or systems. Some embodiments of the inventive concept, however, may provide a stand-alone system and/or method that can be used by industrial control systems as positive feedback that a solenoid valve has been energized. Some existing methods may require direct connection with the wiring and monitoring of the return voltage. Some embodiments of the inventive concept may provide a method that operates in parallel with and may be independent of any existing control hardware.

Some embodiments of the inventive concept may make use of a Hall effect sensor to detect when a solenoid valve has fired, is energized, or is activated. Hall effect sensors may be used to detect the presence and magnitude of magnetic fields. They may also be used in applications where the strength of the field is used to determine the position of the actuator.

Some embodiments of the inventive concept, however, may be specific to the field of filter cleaning, which may require a fast response with positive identification of the correct valve when the solenoid valves are all mounted in very close proximity or in the same enclosure.

In some embodiments, the signal output from each of the Hall effect sensors may be approximately ½ of its input voltage when no magnetic field is present. Therefore, if the sensor is powered with 5 vdc, the output would be 2.5 vdc with no magnetic field present. If a magnetic field is present on the positive side of the sensor, then the output will be greater than 2.5 vdc. If a magnetic field is present on the negative side of the sensor, then the output will be less than 2.5 vdc. Therefore, in an enclosure in which a plurality of solenoid valves and a plurality of corresponding Hall effect sensors are provided, if a valve is fired, then the signal output from the sensor connected to the firing valve will increase and the signal output from the neighboring sensors will decrease. This results in a positive identification of the energized valve.

This positive identification may allow the operator to maintain the filter including the pilot solenoid valves, pulsing valves, and control system in optimal or desired performance by quickly identifying fault rows, which may be having failures. This is accomplished by monitoring key filter operational conditions and knowing which row was being cleaned when normal ranges were exceeded, such as existing dust concentration. Having a positive feedback that a valve fires or is energized may also be important to the filter controller that the output firing request occurred.

A device including a housing with a plurality of solenoid valves contained therein each solenoid valve having a sensor, such as a Hall effect sensor associated therewith, can have different configurations based on the application in accordance with different embodiments. In some embodiments, the device has a discrete output for each valve being monitored. When the device detects that a valve has fired, the associated output may be energized for a predefined time period to allow the local control device, such as a monitoring system time to read the status. Because such embodiments may require a large number of wiring runs, other embodiments of the inventive concept may have a communications port or communication interface (e.g., Ethernet or serial) to allow local devices to read the status of each valve being monitored. This would reduce the wiring and conduit needs for installation. Some embodiments may also have a single discrete output, which may be energized with any valve firing that is detected. When the local controller or monitoring system detects that the output is energized, it could then read the status of the valve that fired or was energized. This configuration may be used to minimize or reduce communications traffic versus constantly reading valve firing statuses from the device. In other embodiments, the device may push the data to a local controller, monitoring system, edge server and/or the cloud. It may also be possible for a device to have combinations of these options to meet site-specific needs as well as local LED indicators for personnel to visually monitor. Based on the final capability of the device, one or more devices may be required to monitor all solenoid pilot valves in a baghouse or in a compartment.

FIG. 1 is a diagram that illustrates a fabric filter system 100, such as a baghouse, that includes an operation and cleaning system along with a separate valve monitoring system according to some embodiments of the inventive concept. In the example shown, the cleaning system uses compressed air as part of a pulse-jet style cleaning technique. It will be understood, however, that embodiments of the inventive concept are not limited to this type of baghouse or cleaning technique, but may be applicable to other types of cleaning techniques and baghouse configurations. As shown in FIG. 1, two fabric filters 105A and 105B are cleaned using a common air supply and valve system. The air supply includes a main air supply 110 and a header supply tank 115, which stores the compressed air in relatively close proximity to a control valve system. The control valve system includes a pulsing valve 120 and a solenoid pilot valve system 125. The solenoid pilot valve 125 may be located on or near the pulsing valve 120 or may be located more remote from the pulsing valve 120 and connected with hose or piping. The pulsing valve 120 may be operable to release statistical pulses of compressed air down a blow tube 130, which directs the statistical air pulses into the fabric filters 105A and 105B to dislodge particles and other residue that accumulate in the filters. An air flow monitor may be used to monitor one or more metrics of the air flow flowing through the pulsing valve during a cleaning pulse including, but not limited to, a maximum air flow rate during the statistical pulse of air, a time duration of the statistical pulse of air, a total air consumption during the statistical pulse of air, a flow rate increase during the statistical pulse of air, and a flow rate decrease during the statistical pulse of air. A valve controller 140 is communicatively coupled to both the solenoid pilot valve system 125 and the pulsing valve 120. These connections may be wired and/or wireless connections in accordance with various embodiments of the inventive concept. The valve controller 140 may control operation of the solenoid pilot valve 125 to initiate and terminate statistical pulses of air used to clean the fabric filters 105A and 105B. The valve controller 140 includes a filter operation and cleaning module 145 that is configured manage both filtering operations of the fabric filter system 100 and cleaning operations of the fabric filter system. The baghouse fabric filter system 100 further comprises data collection devices 135, which may include the air flow monitor, one or more of magnetic reed switches, optical switches, pressure switches, flow switches/sensors, proximity sensors, temperature sensors, particular matter concentration (dust concentration) analyzer/sensor, and the like that are configured to obtain data for one or more operational and/or cleaning parameters. These data may be used, for example, to evaluate one or more performance metrics to diagnose the filtering and/or cleaning operations of the entire baghouse fabric filter system 100 and/or components thereof. A valve monitoring system 150 may be communicatively coupled to an interface 127 of the solenoid pilot valve system 125 via the data collection devices 135 or, in other embodiments, may be communicatively coupled to the interface 127 via a wired or wireless connection. The valve monitoring system 150 may include a valve monitoring module 155 that is configured to process one or more status signals output from the solenoid pilot valve system 125 via the interface. These signals may be, in some embodiments, voltage signals having a variety of pulse shapes. In other embodiments, the signals may be configured in accordance with a communication protocol over a communication port provided via the interface 127, such as the Ethernet communication protocol or a serial protocol. In some embodiments, the interface 127 may provide visual or auditory notifications of the operation and/or operational failures of one or more of the solenoid valves of the solenoid pilot valve system 125. The valve monitoring module 155 may be configured to process the signals output from the interface 127 of the solenoid pilot valve system 125 to monitor the operational status of various ones of the solenoid pilot valves. In some embodiments, different signals may be output for each one of the valves in the solenoid pilot valve system 125. In other embodiments, a group status signal may be output that indicates one of the solenoid pilot valves has been energized or is proximate to another solenoid pilot valve that has been energized. The valve monitoring module 155 may then read the status of the solenoid pilot valve system 125 by way of the interface 127 to determine the identity of the valve that was energized or was in proximity to a valve that was energized. The valve monitoring module 155 may cause performance of a diagnostic operation and/or a maintenance operation on one or more of the solenoid pilot valves in the solenoid pilot valve system 125 based on determining whether various ones of the valves were energized when intended or failed to energize when intended. Diagnostic and/or maintenance operations may also be initiated on other components of the fabric filter system 100 based on the operational status information obtained for the solenoid pilot valves in the solenoid pilot valve system 125.

Figure 2:
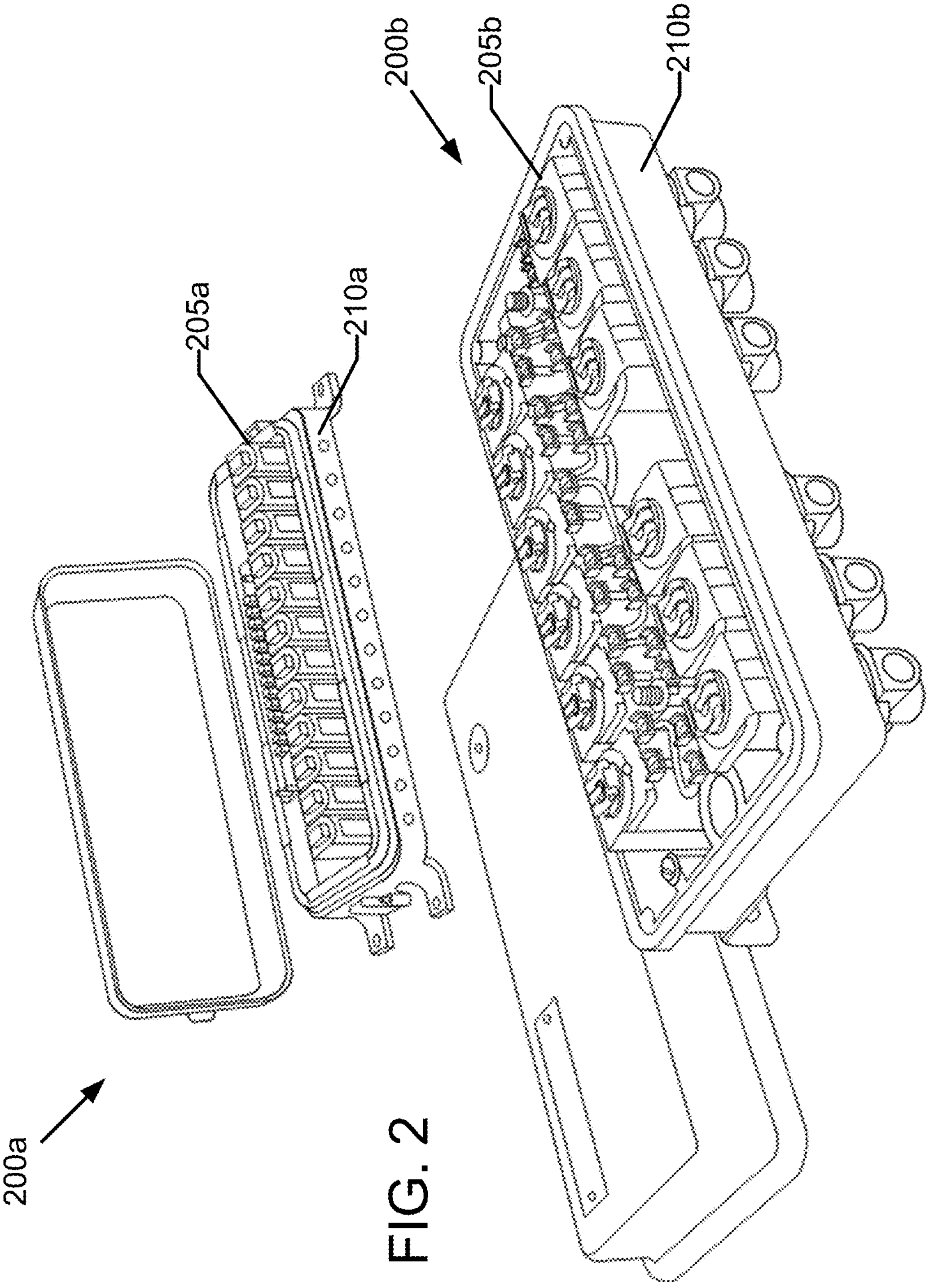
FIG. 2 illustrates examples of a solenoid pilot valve system in accordance with some embodiments of the inventive concept.

FIG. 2 illustrates examples of the solenoid pilot valve system 125 in accordance with some embodiments of the inventive concept. As shown in FIG. 2, a solenoid pilot valve system 200*a* includes twelve solenoid pilot valves 205*a* arranged in a linear formation inside a housing 210*a* in which the housing lid is removed. A solenoid pilot valve system 200*b* includes twelve solenoid pilot valves 205*b* arranged in two rows of six valves each inside a housing 210*b* in which the housing lid is removed. In some embodiments, one or more valves may be associated with a row of one or more bag filters to facilitate, for example, cleaning operations therefor.

Figure 3:
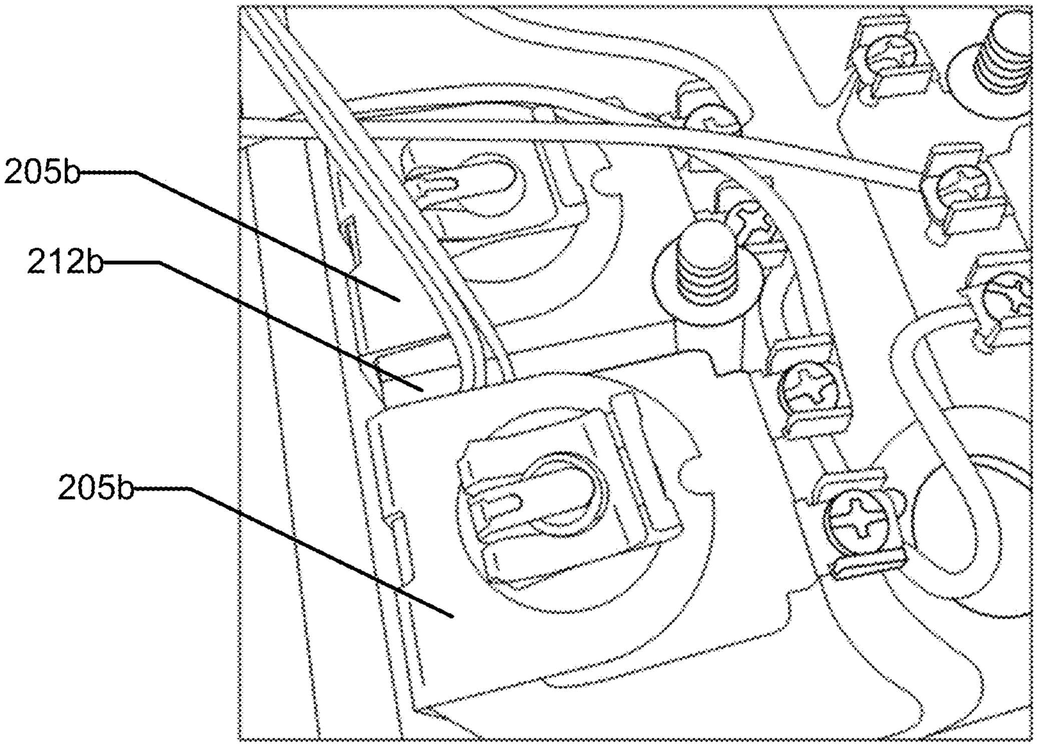
FIG. 3 illustrates an example arrangement of solenoid pilot valves in which a sensor is placed between and in proximity to the coils of adjacent solenoid pilot valves according to some embodiments of the inventive concept.

FIG. 3 illustrates an example arrangement of the solenoid pilot valves 205*b* of FIG. 2 in which a sensor 212*b* is placed between and in proximity to the coils of adjacent solenoid pilot valves 205*b*. As described above, the sensor may be a Hall effect sensor that is configured to detect when a solenoid valve has fired, is energized, or is activated. A sensor 212 can be placed next to each of the solenoid pilot valves 205*a*/205*b* in the solenoid pilot valve systems 200*a*/200*b*. In some embodiments, the positive side of the sensor may be placed adjacent to the solenoid pilot valve 212*a*/212*b* that the sensor 212 is associated with. In some embodiments, the signal output from each of the Hall effect sensors may be approximately ½ of its input voltage when no magnetic field is present. If a magnetic field is present on the positive side of the sensor, then the output will be greater than ½ of its input voltage. If a magnetic field is present on the negative side of the sensor, then the output will be less than ½ of its input voltage. Therefore, in housing in which a plurality of solenoid valves and a plurality of corresponding Hall effect sensors are provided, if a valve is fired, then the signal output from the sensor connected to the firing valve will increase and the signal output from the neighboring sensors will decrease. This results in a positive identification of the energized valve.

Figure 4:
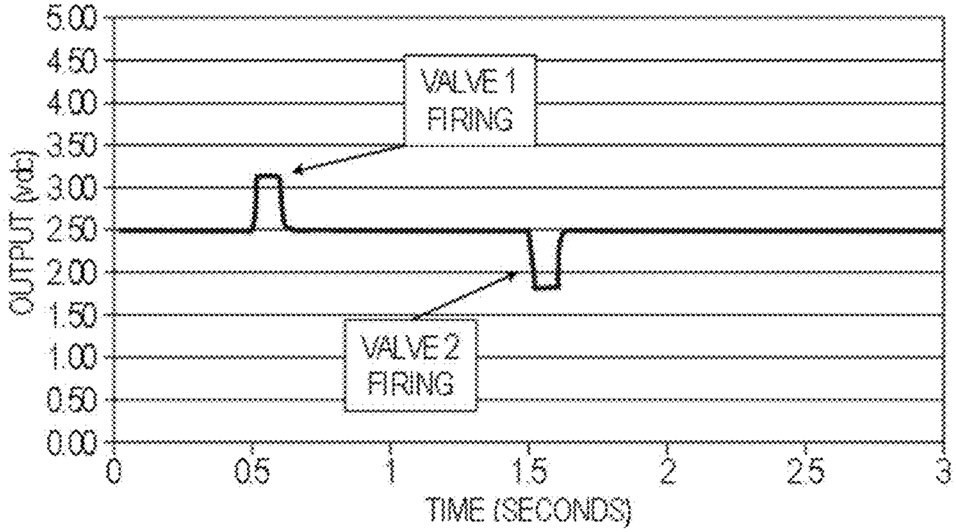
FIG. 4 is a chart that illustrates the output voltage of a sensor that is placed between a first and second valve and is associated with a first valve according to some embodiments of the inventive concept.

Embodiments of the inventive concept may be illustrated by way of example. FIG. 4 illustrates an output signal of a Hall effect sensor that is placed between a first (valve 1) and second (valve 2) in a pilot valve enclosure. The positive side of the hall sensor was connected to valve 1. The input voltage was 5 vdc and the normal output (ambient voltage), without any valve firing, was approximately 2.5 vdc.

The testing was accomplished by using a standard pulse-jet output card to fire each valve for a duration of 100 milliseconds, which is a common firing time duration. This test gives a clean indication that the Hall sensor can provide the distinction between different valves firing in close proximity of each other. The testing indicated that the magnitude of the peaks may be correlated with where the sensor is placed on the solenoid. The test data was sampled and recorded every 0.01 seconds. As shown, in FIG. 4, when valve 1 is energized, the ambient voltage increases to slightly over 3 vdc. When valve 2 is energized, the Hall sensor associated with valve 1 (positive side of the sensor is oriented towards valve 1), the sensor output decreases to slightly under 2 vdc.

Figure 5:
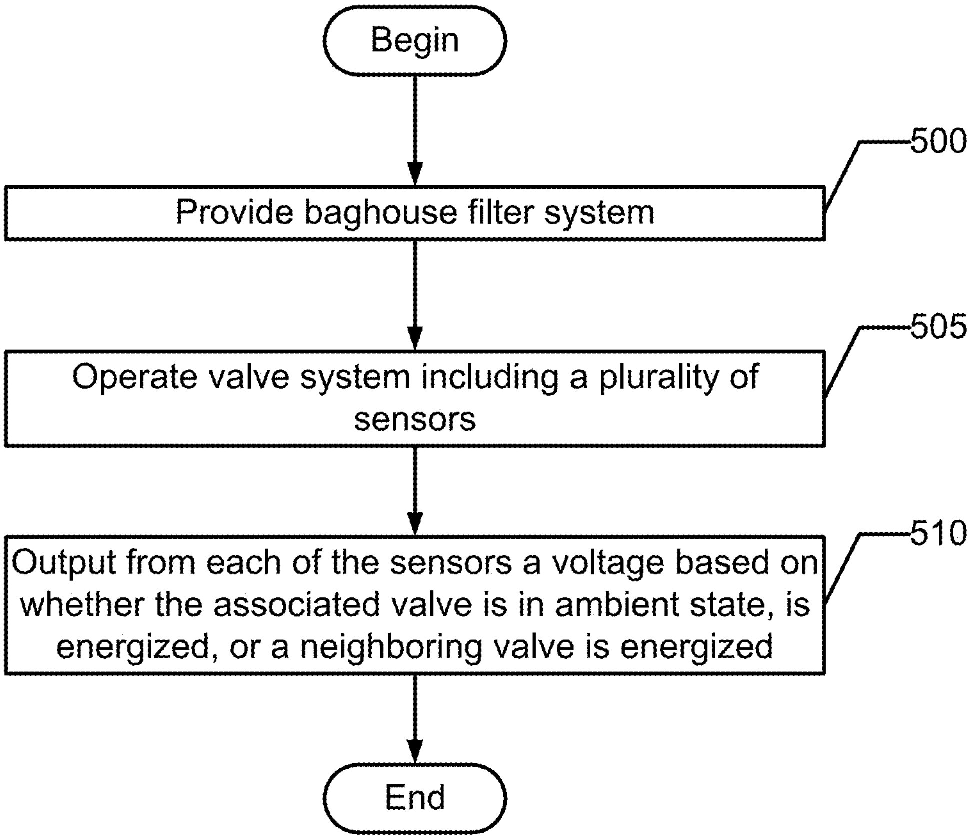
FIG. 5 is a flowchart that illustrates operations for monitoring operation of a solenoid pilot valve according to some embodiments of the inventive concept.

FIG. 5 is a flowchart that illustrates operations for operating a fabric filter system including monitoring of solenoid pilot valves in accordance with some embodiments of the inventive concept. Operations begin at block 500 where a fabric filter system 100, such as that illustrated in FIG. 1 is provided. A valve system including a plurality of sensors is operated at block 505. Each of the sensors outputs a voltage based on whether the associated solenoid valve is in an ambient state, is energized, or a neighboring valve is energized.

Figure 6:
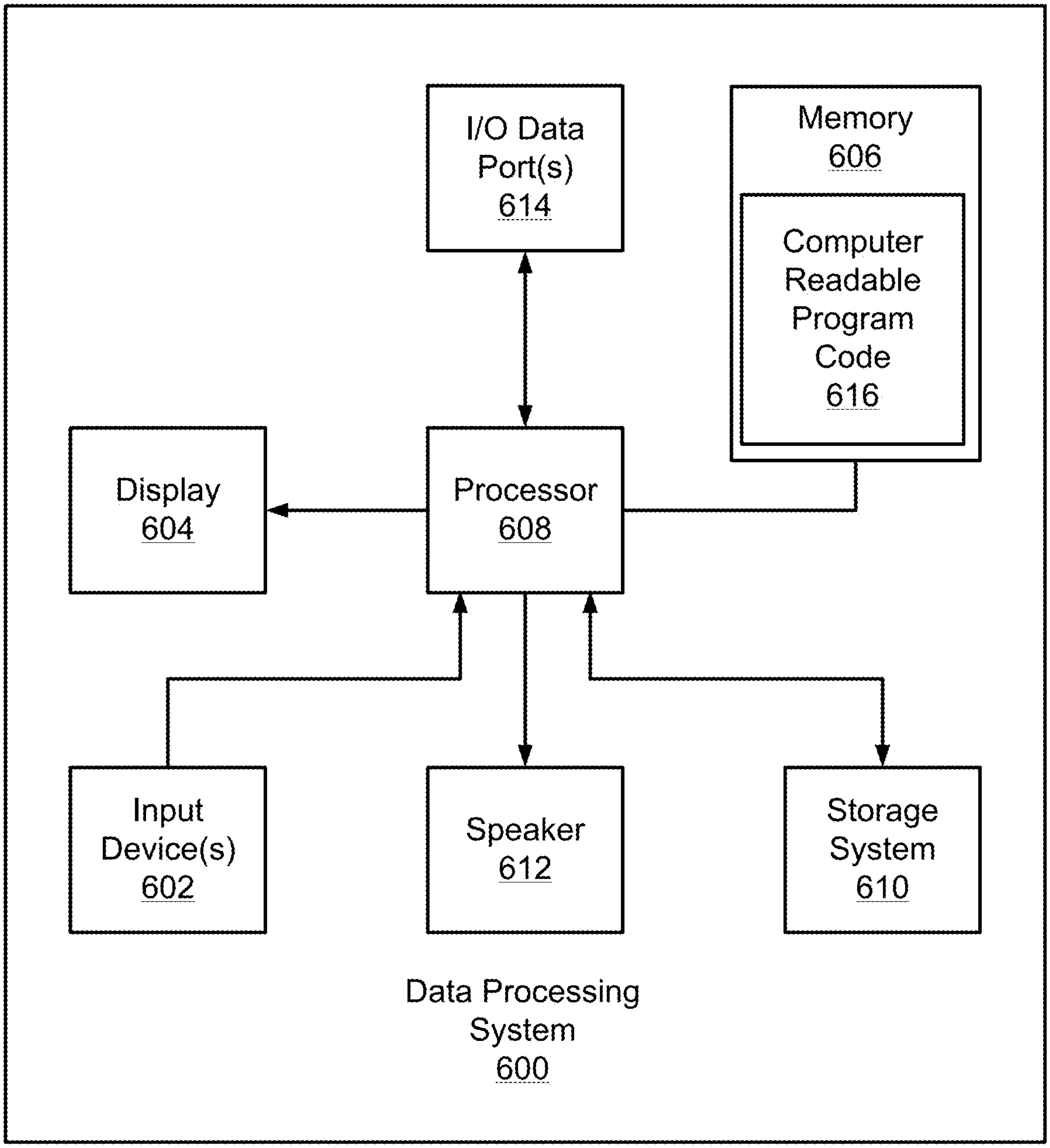
FIG. 6 is a data processing system that may be used to implement the valve monitoring system of FIG. 1 in accordance with some embodiments of the inventive concept.

Referring now to FIG. 6, a data processing system 600 that may be used to implement the valve monitoring system 150 of FIG. 1, in accordance with some embodiments of the inventive concept, comprises input device(s) 1302, such as a keyboard or keypad, a display 1304, and a memory 1306 that communicate with a processor 1308. The data processing system 1300 may further include a storage system 1310, a speaker 1312, and an input/output (I/O) data port(s) 1314 that also communicate with the processor 1308. The processor 1308 may be, for example, a commercially available or custom microprocessor. The storage system 1310 may include removable and/or fixed media, such as floppy disks, ZIP drives, hard disks, or the like, as well as virtual storage, such as a RAMDISK. The I/O data port(s) 1314 may be used to transfer information between the data processing system 1000 and another computer system or a network (e.g., the Internet). The memory 1306 may be configured with computer readable program code 616 to monitor the operational status of one or more solenoid valves through the use of one or more sensors, such as Hall effect sensors.

Figure 7:
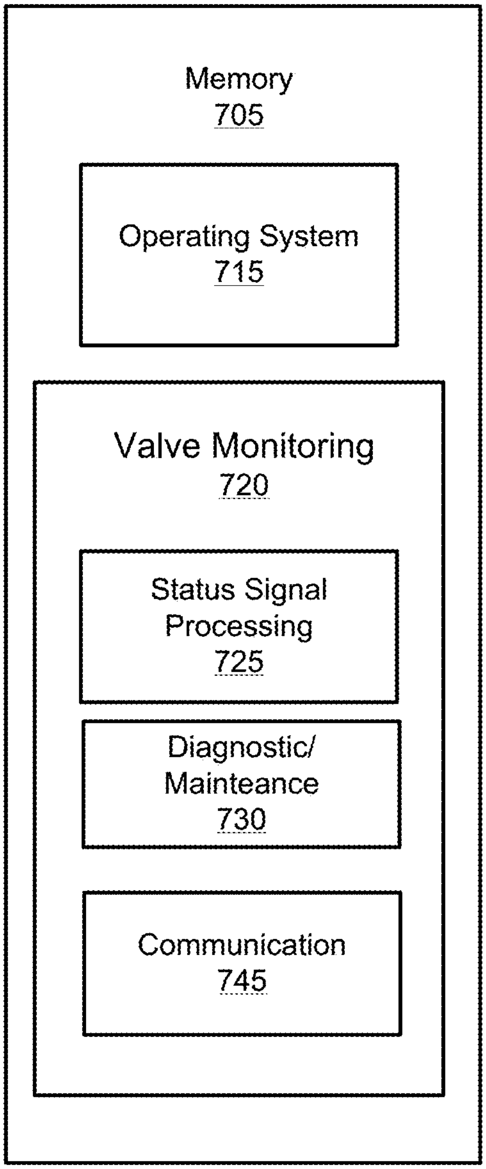
FIG. 7 is a block diagram that illustrates a software/hardware architecture for use in the valve monitoring system of FIG. 1 in accordance with some embodiments of the inventive concept.

FIG. 7 illustrates a memory 705 that may be used in embodiments of data processing systems, such as the valve monitoring system 150 of FIG. 1 and the data processing system 600 of FIG. 6, respectively, to evaluate the operational status of one or more solenoid valves, such as solenoid pilot valves, used in a valve system. The memory 705 is representative of the one or more memory devices containing the software and data used for facilitating operations of the valve monitoring system 150 as described herein. The memory 1405 may include, but is not limited to, the following types of devices: cache, ROM, PROM, EPROM, EEPROM, flash, SRAM, and DRAM.

As shown in FIG. 7, the memory 705 may contain two or more categories of software and/or data: an operating system 715 and a valve monitoring module 720. In particular, the operating system 715 may manage the data processing system's software and/or hardware resources and may coordinate execution of programs by the processor. The valve monitoring module 720 may correspond to the valve monitoring module 155 of FIG. 1 and may comprise a status signal processing module 725, a diagnostic/maintenance module 730, and a communication module 745. The status signal processing module 725 may be configured to process status signals output from the valve system 125 by way of the interface 127. The status signal processing module may be configured to identify which valves have been energized and/or which valves are adjacent to valves that have been energized based on the signals output from the valve system 125. Based on the signals processed by the status signal processing module 725, one or more diagnostic or maintenance operations may be initiated and/or performed on the valve system 125, interface 127, or other component of the fabric filter system 100. The communication module 745 may be configured to facilitate communication between the valve monitoring system 150 and the pilot valve system 125, interface 127, data collection devices 135, valve controller 140, or other local systems or systems or applications or systems or applications in the cloud that are accessible over one or more networks, such as the Internet.

Although FIGS. 6 and 7 illustrate hardware/software architectures that may be used in data processing systems, such as the valve monitoring system 150 of FIG. 1 in accordance with some embodiments of the inventive concept, it will be understood that the present invention is not limited to such a configuration but is intended to encompass any configuration capable of carrying out operations described herein.

Computer program code for carrying out operations of data processing systems discussed above with respect to FIGS. 1-7 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the valve monitoring system 150 and the data processing system 600 of FIG. 6 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Some embodiments of the inventive concept may provide the ability to identify which solenoid valve, among a plurality of solenoid valves, is firing. This information, which heretofore has not been available, may allow plant personnel to diagnose and trouble-shoot baghouse problems by providing a positive feed-back with respect to which valve has fired and initiate and/or perform diagnostic and/or maintenance operations on the baghouse in response thereto. This information can then be used to identify a frozen diaphragm valve, broken bag leaks, etc. down to the row. Embodiments of the inventive concept may also provide a safety benefit. Providing personnel with local indication of valves firing without them having to open the valve enclosures may reduce or eliminate the risk of electrical shock. Not having to open the enclosure can also eliminate the risk of foreign materials getting into the enclosure when it is open, which may result in short circuits or equipment damage. Moreover, according to some embodiments, the device is not integrated into a system for valve control and management; it is completely standalone and operates in parallel with any valve firing or control system.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure of embodiments has been presented for purposes of illustration and description, but is not intended to be exhaustive or limited to the disclosure in the form disclosed. Many variations and modifications can be made to the embodiments without substantially departing from the principles of the present invention. All such variations and modifications are intended to be included herein within the scope of the present invention.

What is claimed is:

1. A system, comprising:

a baghouse filter system comprising a plurality of fabric filters; and a valve system comprising a plurality of solenoid pilot valves each of the plurality of solenoid pilot valves including a solenoid coil, the plurality of solenoid pilot valves being operable to selectively release compressed air into the plurality of fabric filters, respectively, responsive to one or more valve control signals, the valve system further comprising a plurality of sensors associated respectively corresponding to the plurality of solenoid coils, each of the plurality of sensors being configured to output an ambient voltage when its corresponding solenoid coil is not energized, a first voltage when its corresponding solenoid coil is energized, and a second voltage when a neighboring solenoid coil is energized.

2. The system of claim 1, further comprising:

a control system configured to generate the one or more valve control signals.

3. The system of claim 1, wherein the plurality of sensors comprises a plurality of Hall effect sensors.

4. The system of claim 3, wherein each of the plurality of Hall effect sensors has a positive side that is positioned closed to the respective one of the plurality of solenoid coils to which it corresponds; and wherein the first volage is greater than the ambient voltage and the second voltage is less than the ambient voltage.

5. The system of claim 1, further comprising:

a monitoring system that is configured to receive an output from the plurality of sensors based on the ambient voltage, the first voltage and the second voltage.

6. The system of claim 5, wherein the valve system comprises a communication interface; and wherein the communication interface is configured to output one or more status signals for one or more of the plurality of solenoid pilot valves based on the ambient voltage, the first voltage, and the second voltage.

7. The system of claim 6, wherein the monitoring system is configured to receive the one or more status signals.

8. The system of claim 7, wherein the monitoring system is configured to cause performance of a diagnostic operation or a maintenance operation on one or more of the plurality of solenoid pilot valves based on the one or more status signals.

9. The system of claim 6, wherein the one or more status signals comprises a group status signal that indicates one of the plurality of solenoid valves has been energized without identifying the one of the plurality of solenoid valves; and wherein the monitoring system is configured to receive the group status signal.

10. The system of claim 9, wherein the monitoring system is further configured to determine the status of at least a portion of the respective ones of the plurality of solenoid valves responsive to the group status signal; and wherein the monitoring system is further configured to cause performance of a diagnostic operation or a maintenance operation on one or more of the plurality of solenoid pilot valves based on the status determinations for at least the portion of the respective ones of the plurality of solenoid valves.

11. The system of claim 5, wherein the monitoring system is configured to cause performance of a diagnostic operation or a maintenance operation on one or more of the plurality of solenoid pilot valves based on the ambient voltage, the first voltage and the second voltage.

12. A method, comprising:

providing a baghouse filter system comprising a plurality of fabric filters;

operating a valve system comprising a plurality of solenoid pilot valves each of the plurality of solenoid pilot valves including a solenoid coil to selectively release compressed air into the plurality of fabric filters, respectively, responsive to one or more valve control signals, the valve system further comprising a plurality of sensors associated respectively corresponding to the plurality of solenoid coils; and outputting, from each of the plurality of sensors, an ambient voltage when its corresponding solenoid coil is not energized, a first voltage when its corresponding solenoid coil is energized, and a second voltage when a neighboring solenoid coil is energized.

13. The method of claim 12, further comprising:

generating the one or more valve control signals using a control system.

14. The method of claim 12, wherein the plurality of sensors comprises a plurality of Hall effect sensors.

15. The method of claim 14, wherein each of the plurality of Hall effect sensors has a positive side that is positioned closed to the respective one of the plurality of solenoid coils to which it corresponds.

16. The method of claim 15, wherein the first voltage is greater than the ambient voltage and the second voltage is less than the ambient voltage.

17. The method of claim 12, further comprising:

receiving, at a monitoring system, an output from the plurality of sensors based on the ambient voltage, the first voltage and the second voltage.

18. The method of claim 17, wherein the valve system comprises a communication interface, the method further comprising:

outputting, using the communication interface, one or more status signals for one or more of the plurality of solenoid pilot valves based on the ambient voltage, the first voltage, and the second voltage.

19. The method of claim 18, further comprising:

receiving the one or more status signals at the monitoring system; and causing performance of a diagnostic operation or a maintenance operation on one or more of the plurality of solenoid pilot valves based on the one or more status signals.

20. A device, comprising:

a housing; and a valve system in the housing, the valve system comprising a plurality of solenoid pilot valves each of the plurality of solenoid pilot valves including a solenoid coil, the plurality of solenoid pilot valves being operable to selectively release compressed air responsive to one or more valve control signals, the valve system further comprising a plurality of sensors associated respectively corresponding to the plurality of solenoid coils, each of the plurality of sensors being configured to output an ambient voltage when its corresponding solenoid coil is not energized, a first voltage when its corresponding solenoid coil is energized, and a second voltage when a neighboring solenoid coil is energized.

* * * * *